United States Patent
Odulio et al.

(10) Patent No.: US 7,441,996 B2
(45) Date of Patent: Oct. 28, 2008

(54) VEHICLE FLOATING NUT ASSEMBLY

(75) Inventors: Mark Odulio, Windsor (CA); Mike Smith, Highland, MI (US); Youichi Yamamoto, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 136 days.

(21) Appl. No.: 10/740,588

(22) Filed: Dec. 22, 2003

(65) Prior Publication Data

US 2005/0134069 A1 Jun. 23, 2005

(51) Int. Cl.
*F16B 39/284* (2006.01)
(52) U.S. Cl. .................. 411/111; 411/112; 411/171
(58) Field of Classification Search ............ 411/235, 411/111, 108, 113, 112
See application file for complete search history.

(56) References Cited

U.S. PATENT DOCUMENTS

| | | | | |
|---|---|---|---|---|
| 2,384,729 | A | * | 9/1945 | Darby ................... 411/85 |
| 2,682,906 | A | * | 7/1954 | Poupitch ................ 411/112 |
| 3,217,772 | A | * | 11/1965 | Adams .................. 411/112 |
| 4,193,435 | A | * | 3/1980 | Charles et al. .......... 411/113 |
| 4,673,205 | A | * | 6/1987 | Drewek ................. 293/132 |
| 4,762,451 | A | * | 8/1988 | Collins ................. 411/177 |
| 4,819,980 | A | | 4/1989 | Sakata et al. |
| 4,856,954 | A | * | 8/1989 | Peterson ............... 411/427 |
| 4,863,327 | A | * | 9/1989 | Poupiter ............... 411/112 |
| 4,875,816 | A | * | 10/1989 | Peterson ............... 411/104 |
| 4,934,886 | A | * | 6/1990 | Aikens ................. 411/85 |
| 5,013,391 | A | * | 5/1991 | Hutter et al. .......... 156/578 |
| 5,022,804 | A | * | 6/1991 | Peterson ............... 411/104 |
| 5,067,863 | A | * | 11/1991 | Kowalski .............. 411/85 |
| 5,096,350 | A | * | 3/1992 | Peterson ............... 411/12 |
| 5,170,985 | A | | 12/1992 | Killworth et al. |
| 5,193,643 | A | * | 3/1993 | McIntyre .............. 180/312 |
| 5,281,064 | A | * | 1/1994 | Zimmer ................ 411/85 |
| 5,409,289 | A | * | 4/1995 | Kalian et al. .......... 296/204 |
| 5,605,353 | A | * | 2/1997 | Moss et al. ............ 280/784 |
| 5,618,237 | A | * | 4/1997 | Shinjo ................. 470/91 |
| 5,624,319 | A | * | 4/1997 | Golczyk et al. ......... 470/21 |
| 5,630,686 | A | * | 5/1997 | Billmann .............. 411/112 |
| 5,779,412 | A | * | 7/1998 | Nagai et al. ........... 411/85 |
| 5,884,963 | A | * | 3/1999 | Esposito et al. ........ 296/187.09 |
| 5,918,727 | A | * | 7/1999 | Wallace et al. ......... 198/690.1 |
| 5,928,711 | A | * | 7/1999 | Wallace et al. ......... 427/8 |
| 6,027,293 | A | * | 2/2000 | Beemer et al. ......... 411/119 |

(Continued)

FOREIGN PATENT DOCUMENTS

JP 8-198140 * 8/1996

*Primary Examiner*—Jack W. Lavinder
(74) *Attorney, Agent, or Firm*—Global IP Counselors, LLP

(57) ABSTRACT

A vehicle floating nut assembly is part of a body mounting fixture that couples a vehicle body onto a vehicle frame. The floating nut assembly has a nut element that floats with in a nut retainer assembly. At least one of the sliding surfaces located between the nut element and the retainer assembly is coated with a coating resistant material such as polytetrafluoroethylene. Thus, the nut retainer assembly is arranged so that the nut element is slideable relative to the planar surface of the retainer assembly within a predetermined range of movement. Several floating nut assemblies are utilized to fixedly couple the vehicle body to the vehicle frame in which one of the vehicle floating nut assemblies includes is arranged to only allow limited movement of the nut element in one linear direction.

33 Claims, 11 Drawing Sheets

U.S. PATENT DOCUMENTS

| | | | | |
|---|---|---|---|---|
| 6,146,071 A * | 11/2000 | Norkus et al. | | 411/104 |
| D450,236 S * | 11/2001 | Shinjo et al. | | D8/397 |
| D451,375 S * | 12/2001 | Shinjo et al. | | D8/397 |
| D451,376 S * | 12/2001 | Shinjo et al. | | D8/397 |
| D451,791 S * | 12/2001 | Shinjo et al. | | D8/397 |
| D452,140 S * | 12/2001 | Shinjo et al. | | D8/397 |
| 6,416,102 B1 * | 7/2002 | Howard | | 296/35.1 |
| 6,644,902 B1 * | 11/2003 | Cutshall | | 411/111 |
| 6,692,206 B1 * | 2/2004 | Clinch et al. | | 411/171 |
| 6,811,363 B1 * | 11/2004 | Minnich | | 411/104 |
| 6,857,691 B2 * | 2/2005 | Kuroda et al. | | 296/203.02 |
| 6,938,948 B1 * | 9/2005 | Cornell et al. | | 296/187.09 |
| 6,979,158 B2 * | 12/2005 | Clinch et al. | | 411/112 |
| 7,021,875 B2 * | 4/2006 | Yake et al. | | 411/111 |
| 7,134,821 B2 * | 11/2006 | Clinch et al. | | 411/171 |
| 7,188,877 B2 * | 3/2007 | Gonzalez et al. | | 293/133 |
| 7,192,231 B2 * | 3/2007 | Blackaby | | 411/111 |
| 2002/0063445 A1 * | 5/2002 | Takeuchi | | 296/204 |
| 2002/0085896 A1 * | 7/2002 | Werner et al. | | 411/366.1 |
| 2003/0034673 A1 * | 2/2003 | Sugihara et al. | | 296/204 |
| 2004/0005205 A1 * | 1/2004 | Yake et al. | | 411/112 |
| 2004/0013492 A1 * | 1/2004 | Clinch et al. | | 411/112 |
| 2004/0033121 A1 * | 2/2004 | Clinch et al. | | 411/111 |
| 2004/0042868 A1 * | 3/2004 | Yake et al. | | 411/111 |
| 2004/0047705 A1 * | 3/2004 | Cutshall | | 411/111 |
| 2004/0056515 A1 * | 3/2004 | Nomura | | 296/193.09 |
| 2004/0081530 A1 * | 4/2004 | Lee | | 411/111 |
| 2004/0136804 A1 * | 7/2004 | Clinch et al. | | 411/111 |
| 2004/0136805 A1 * | 7/2004 | Miller et al. | | 411/112 |
| 2004/0140694 A1 * | 7/2004 | Miyabayashi | | 296/203.02 |
| 2004/0145216 A1 * | 7/2004 | Kuroda et al. | | 296/203.02 |
| 2004/0228700 A1 * | 11/2004 | Clinch et al. | | 411/112 |
| 2005/0025603 A1 * | 2/2005 | Hullman et al. | | 411/111 |
| 2006/0249962 A1 * | 11/2006 | Gonzalez et al. | | 293/133 |

\* cited by examiner

US 7,441,996 B2

VEHICLE FLOATING NUT ASSEMBLY

BACKGROUND OF THE INVENTION

1. Field of the Invention

The present invention generally relates to a body mounting arrangement for mounting a vehicle body to a vehicle frame. More specifically, the present invention relates to a body mounting fixture having a vehicle floating nut assembly that is installed between a vehicle frame and a vehicle body.

2. Background Information

Some vehicles are constructed with a vehicle body that is mounted on a vehicle frame by a plurality of body mounting fixtures. In particular, the vehicle frame typically has a pair of the longitudinally extending frame member connected together by lateral cross frame members. Typically, the body mounting fixtures are located at a plurality of longitudinally spaced mounting points on each of the longitudinally extending frame members. These body mounting fixtures are connected to the vehicle body at a plurality of longitudinally spaced mounting points corresponding to the mounting points of the vehicle frame. Often the body mounting fixtures are provided with resilient insulators that minimize vibrations being transmitted from the frame to the body. Each of the resilient insulators is usually constructed of one or more rubber members and one or more metal support members. The body mounting fixture typically uses a bolt and nut arrangement to fixedly secure the vehicle body to the vehicle frame.

In assembling a vehicle having a vehicle body and a vehicle frame with a plurality of body mounting fixtures, the nuts of the body mounting fixtures are often attached to the vehicle body prior to painting the vehicle body and prior to attaching the vehicle body to the vehicle frame. Some body mounting fixtures are configured such that the nut is secured to the frame in a floating manner to make it easier to align the mounting points of the vehicle body and the vehicle frame.

In view of the above, it will be apparent to those skilled in the art from this disclosure that there exists a need for an improved vehicle floating nut assembly. This invention addresses this need in the art as well as other needs, which will become apparent to those skilled in the art from this disclosure.

SUMMARY OF THE INVENTION

It has been discovered that when nuts of the body mounting fixtures are attached to the vehicle body prior to painting, the paint sometimes acts as an adhesive which secures the nuts to the vehicle body such that the nuts cannot float. Thus, when the vehicle body is attached to the vehicle frame, it is often difficult to properly align the nuts with the bolts.

Thus, one object of the present invention is to provide a vehicle floating nut assembly for a body mounting fixture that can be installed on the vehicle body and painted together with the vehicle body such that the nut of the vehicle floating nut assembly remains floating.

The foregoing object can basically be obtained by providing a vehicle floating nut assembly comprising a nut element and a nut retainer assembly. The nut element is provided with a first axial end surface, a second axial end surface and an axially extending threaded bore. The nut retainer assembly has a mounting plate with an aperture and a retaining member coupled to the mounting plate to retain the nut element such that the second axial end surface of the nut element is arranged to slide on a planar surface of the mounting plate. One of the second axial end surface and the planar surface is coated with a coating resistant material that is resistant to adherence of a coating.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-5, a vehicle 10 is illustrated in which a vehicle body 12 is mounted to a vehicle frame 14 between ten body mounting portions or points $VB_1$-$VB_{10}$ and ten frame mounting portions or points $F_1$-$F_{10}$ in accordance with a first embodiment of the present invention. In particular, in the illustrated embodiment, the vehicle body 12 and the vehicle frame 14 each has five right hand side mounting portions and five left hand side mounting portions. The five right hand side mounting portions $VB_1$, $VB_3$, $VB_5$, $VB_7$ and $VB_9$ of the vehicle body 12 and the five right hand side mounting portions $F_1$, $F_3$, $F_5$, $F_7$ and $F_9$ of the vehicle frame 14 are interconnected by a plurality of right hand side (first) vehicle body mounting fixtures 16R, while four out of the five left hand side mounting portions $VB_4$, $VB_6$, $VB_8$ and $VB_{10}$ of the vehicle body 12 and four out of the five left hand side mounting portions $F_4$, $F_6$, $F_8$ and $F_{10}$ of the vehicle frame 14 are interconnected by a plurality of left hand side (second) vehicle body mounting fixtures 16L. The left hand side mounting portion $VB_2$ of the vehicle body 12 and the left hand side mounting portion $F_2$ of the vehicle frame 14 are interconnected by a left hand side (third) vehicle body mounting fixtures 16L' that is configured to operate in a slightly different manner form the mounting fixtures 16R and 16L as explained below. In particular, the mounting fixtures 16R and 16L are all identical in construction and operate in the same manner. Thus, only one of the mounting fixtures 16R will described and illustrated herein. The description of the mounting fixtures 16R that is described and illustrated herein applies to all of the other mounting fixtures 16R and 16L. The fixtures 16L' is slightly different from the mounting fixtures 16R and 16L. Accordingly only the differences between the mounting fixtures 16L' and the mounting fixture 16R will described and illustrated herein as explained below.

The precise construction of the vehicle body 12 and the vehicle frame 14 are not important to the present invention. Thus, simplified illustrations of the vehicle body 12 and vehicle frame 14 will be used to describe the present invention. Moreover, the vehicle body 12 and vehicle frame 14 will not been discussed in detail herein, except to the extent needed to describe the present invention.

Figure 1:
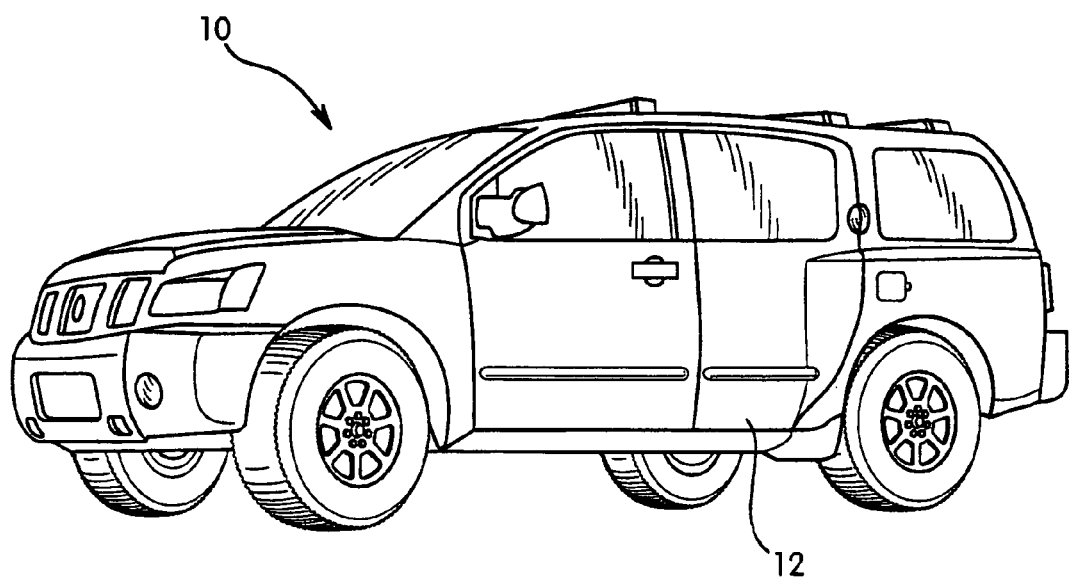
FIG. 1 is a side perspective view of a vehicle equipped with ten vehicle floating nut assemblies in accordance with a preferred embodiment of the present invention.
Figure 2:
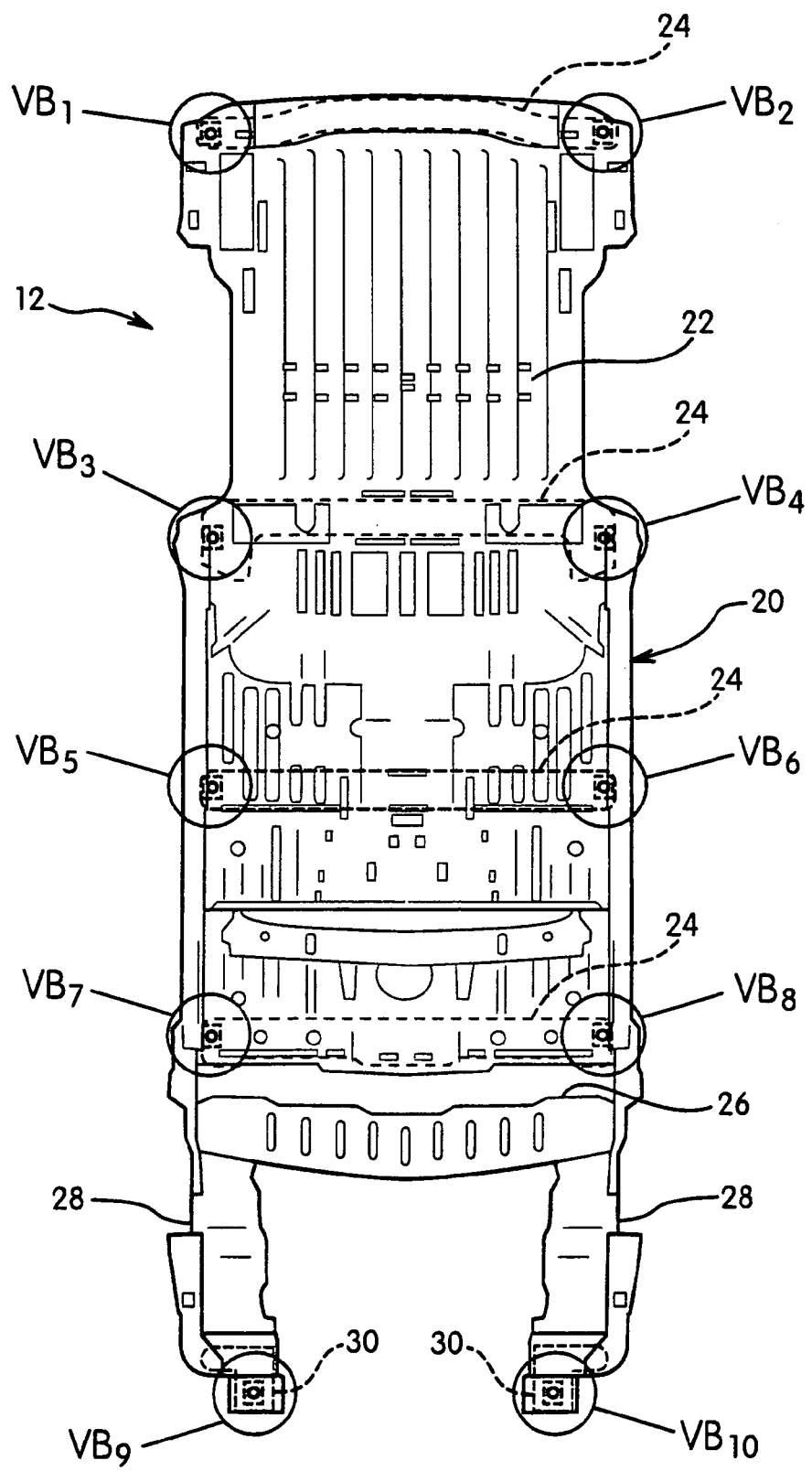
FIG. 2 is a simplified top plan view of a portion of the vehicle body for the vehicle illustrated in FIG. 1 that has ten vehicle floating nut assemblies mounted thereto via a plurality of structural support members, e.g. a four lateral structural support members and two front structural support brackets.
Figure 3:
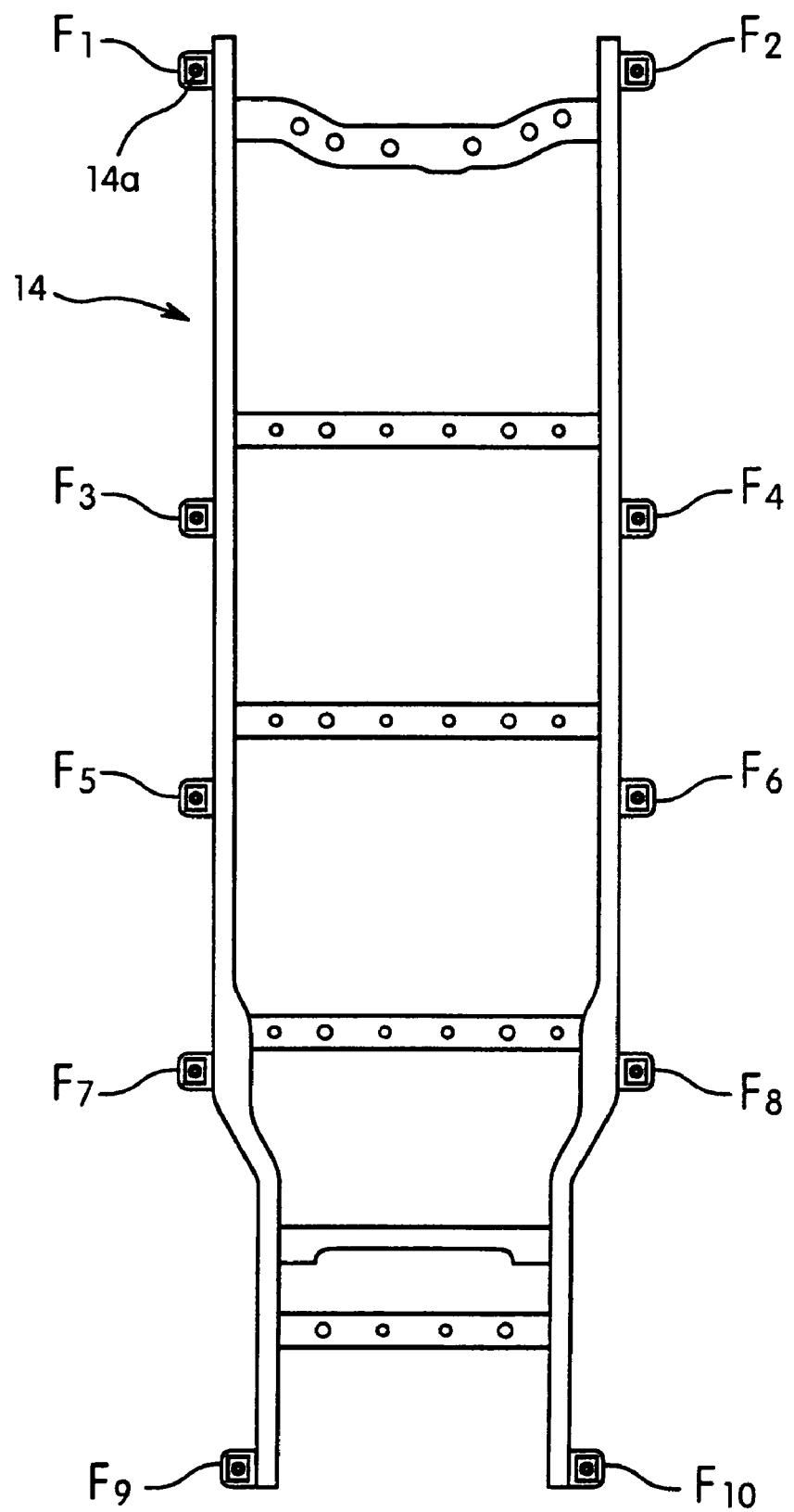
FIG. 3 is a simplified top plan view of the vehicle frame for the vehicle illustrated in FIG. 1 in accordance with the present invention.
Figure 4:
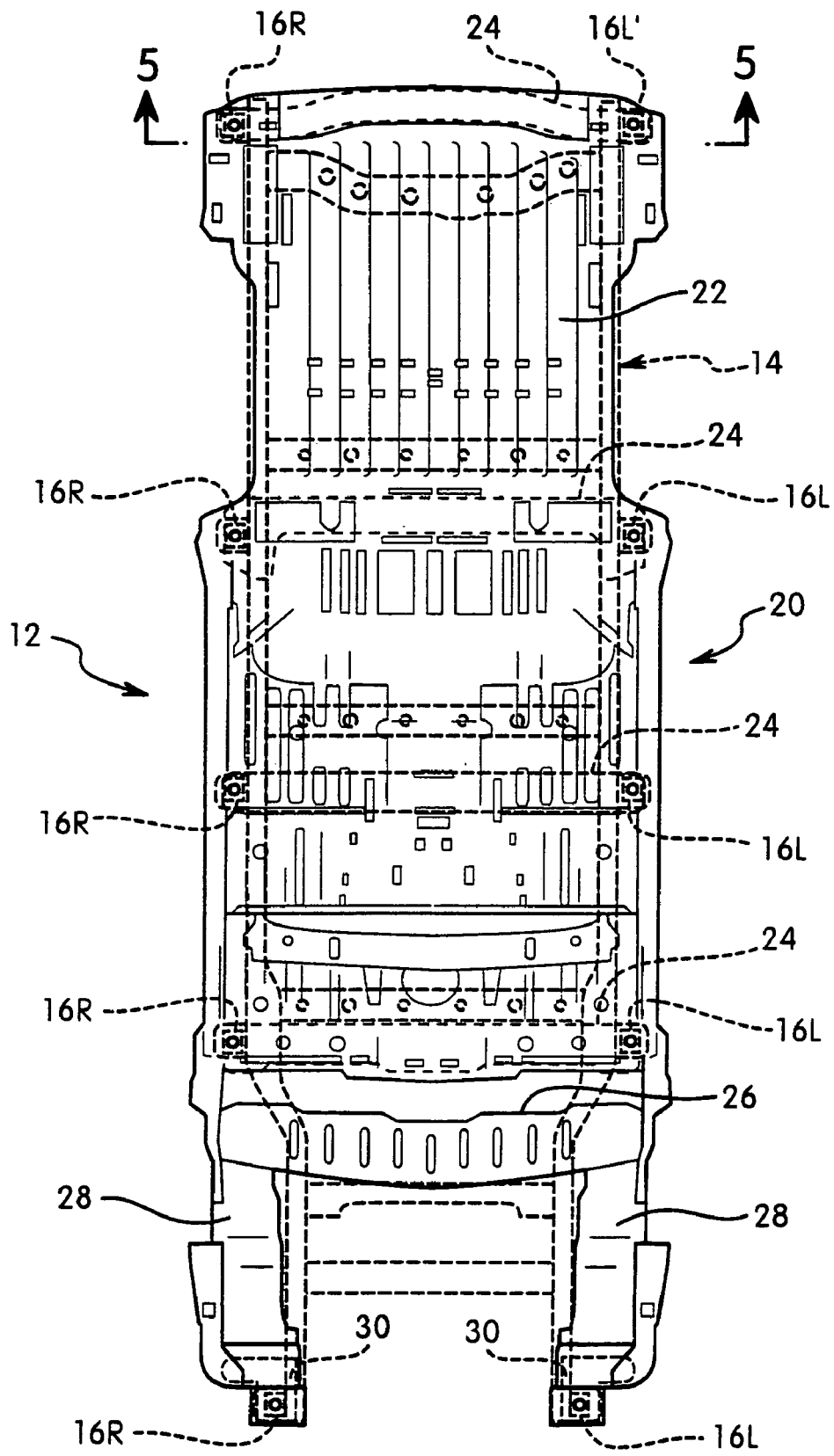
FIG. 4 is a simplified top schematic view of the vehicle body mounted on the vehicle frame in accordance with the present invention.

As seen in FIGS. 1 and 2, basically, the vehicle body 12 is constructed of a plurality of panels and/or structural support members that are fixedly coupled together in a conventional manner. The vehicle body 12 has a lower support structure 20 that basically includes a floor panel 22 with a plurality of lateral structural support members 24, a fire wall structure 26 and a pair of hood ledge structures 28. The front hood ledge structures 28 preferably each includes a structural support member or bracket 30. Typically, these various parts of the vehicle body 12 are constructed of metallic materials that are conventional within the art. Of course, it will be apparent to those skilled in the art from this disclosure that any suitable materials can be utilized as needed and/or desired. Of course, in addition to the previously mentioned body structures, the vehicle body 12 includes many additional body structures which will not be discussed and/or illustrated in detail herein for the sake of brevity.

The lateral structural support members 24 and the structural support brackets 30 (also referred to as "structural members" or "vehicle body elements") are preferably fixedly coupled to the floor panel 22 of the vehicle body 12 by welding or other suitable means. The lateral structural support members 24 and the support brackets 30 have the mounting fixtures 16R, 16L and 16L' fixedly thereto. Typically, these lateral structural support members 24 and the support brackets 30 are assembled separately from the remainder of the vehicle body 12 as will become apparent from the following description of the invention. Thus, the lateral structural support members 24 and the support brackets 30 with the mounting fixtures 16R, 16L and 16L' fixedly coupled thereto can be manufactured separately from the remainder of the vehicle body 12.

The lateral structural support members 24 are preferably fixedly coupled to the floor panel 22 of the vehicle body 12 such that the lateral structural support members 24 are spaced apart in the longitudinal direction of the vehicle body 12. Preferably, there are four lateral structural support members 24 that are coupled to the vehicle body 12. The lateral support members 24 have first and second ends with one of the mounting fixtures 16R, 16L or 16L' that form first and second mounting points of the vehicle body 12. Thus, each of the lateral support members 24 has a first mounting point located on a first longitudinal side of the vehicle body 12, and a second mounting point located on a second longitudinal side of the vehicle body 12. The rearmost one of the lateral support members 24 has one of the mounting fixtures 16R coupled to its right hand end where the first mounting point is formed, while the mounting fixtures 16L' is coupled to its left hand end where the second mounting point is formed. The other three of the lateral support members 24 has one of the mounting fixtures 16R coupled to its right hand end where the first mounting point is formed, and one of the mounting fixtures 16L coupled to its left hand end where the second mounting point is formed.

The hood ledge structures 28 are fixedly coupled to the fire wall structure 26 in a cantilevered manner. Thus, the free ends of the hood ledge structures 28 are not supported by any other parts of the lower support structure 20 such that the hood ledge structures 28 are not restricted from swaying in a lateral direction when the lower support structure 20 of the vehicle body 12 is being attached to vehicle frame 14. As mentioned above, the structural support brackets 30 have the forward most pair of the mounting fixtures 16R and 16L fixedly coupled thereto. The structural support brackets 30 are attached to the hood ledge structures 28 at their free ends. Thus, the mounting fixtures 16R and 16L of the hood ledge structures 28 are mounted in a cantilevered manner with respect to the lower support structure 20.

Figure 5:
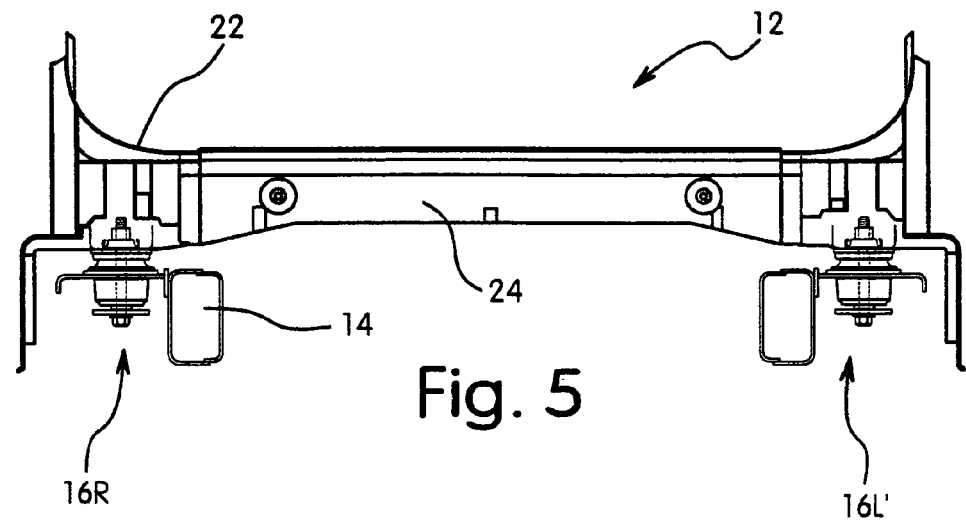
FIG. 5 is a simplified lateral cross-sectional view of the vehicle body and the vehicle frame as viewed along section line 5-5 of FIG. 4.
Figure 6:
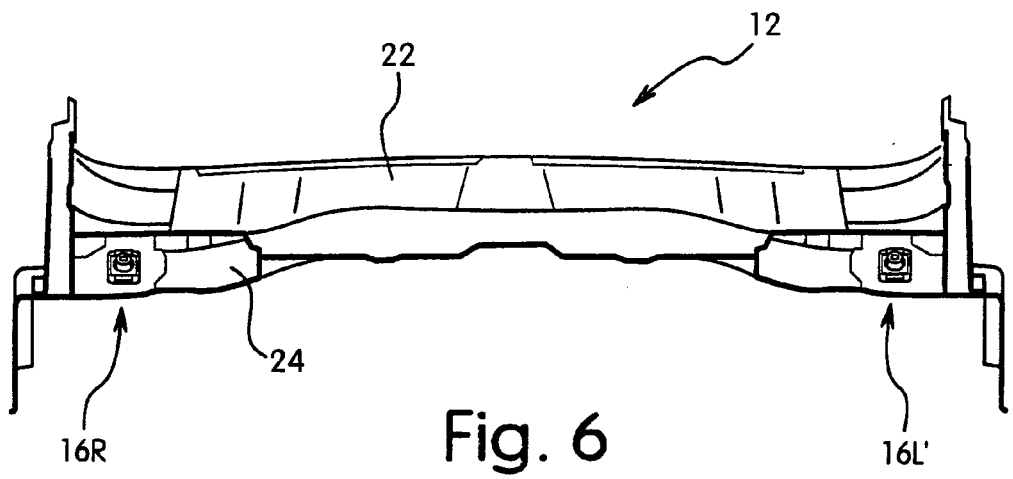
FIG. 6 is a simplified top perspective view of the portion of the vehicle body illustrated in FIG. 5 with certain portions broken away to illustrate the rearmost pair of the vehicle floating nut assemblies.
Figure 7:
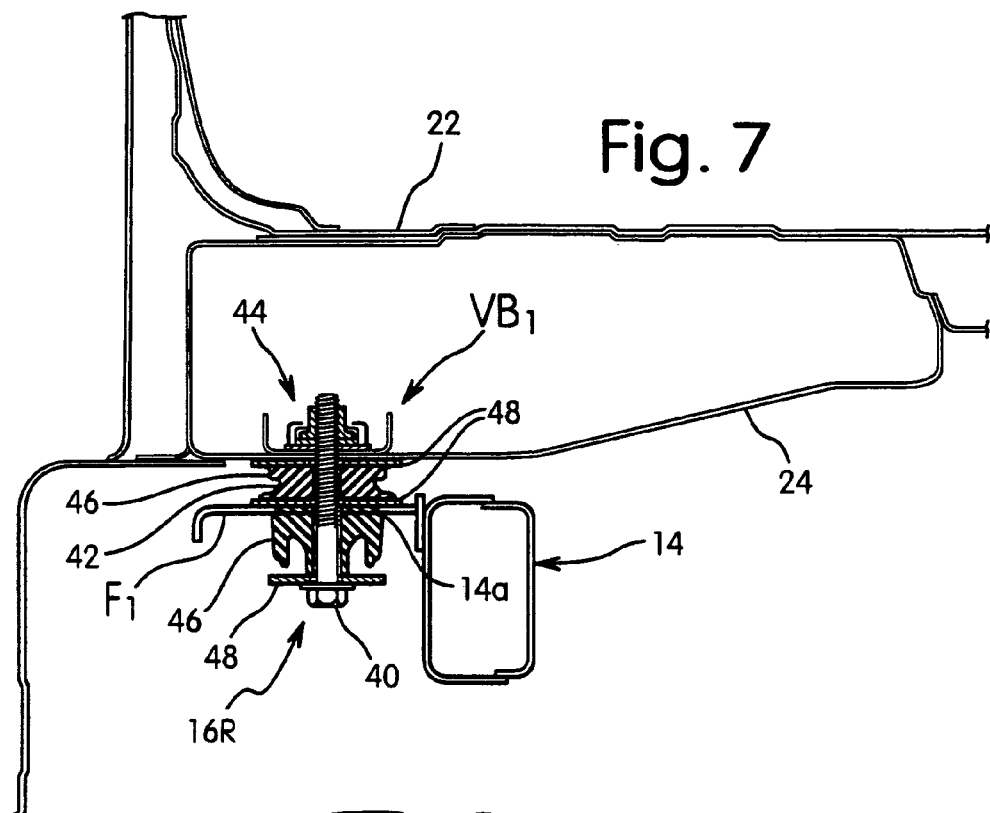
FIG. 7 is an enlarged, partial transverse cross sectional view of the right rear portion of the vehicle body and the vehicle frame with the right rearmost vehicle floating nut assembly coupled between the vehicle body and the vehicle frame in accordance with the present invention.
Figure 8:
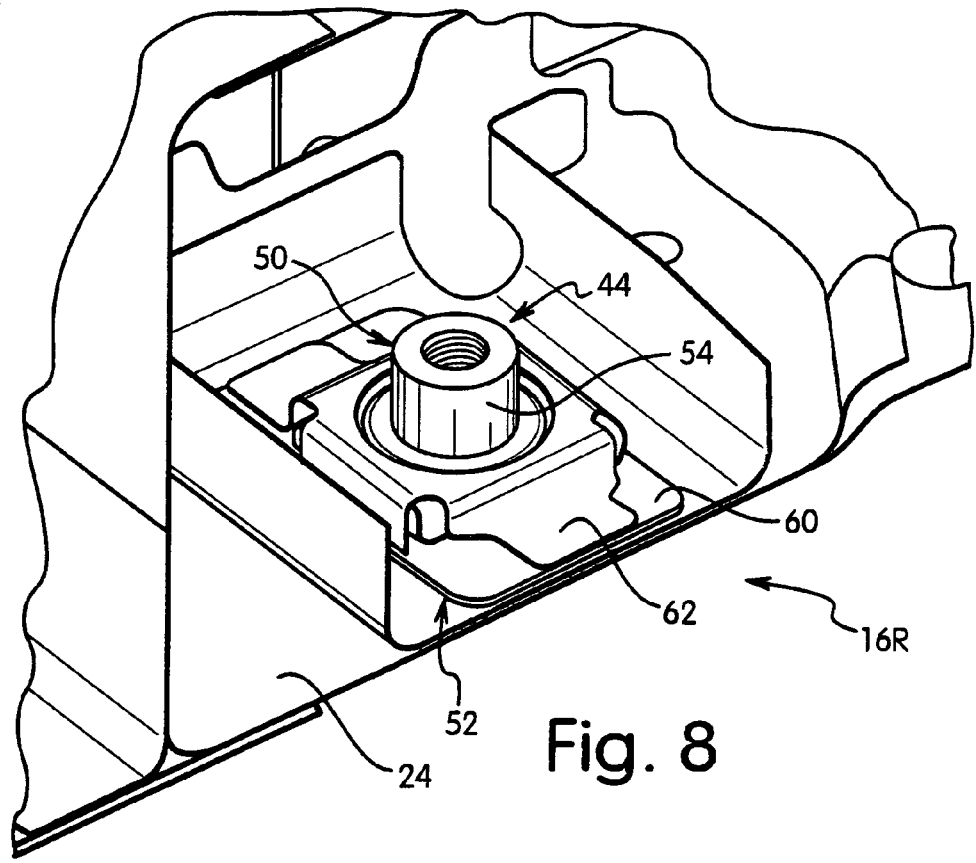
FIG. 8 is a simplified perspective cross sectional view of the rearmost lateral structural support member and the right rearmost vehicle floating nut assembly in accordance with the present invention.
Figure 9:
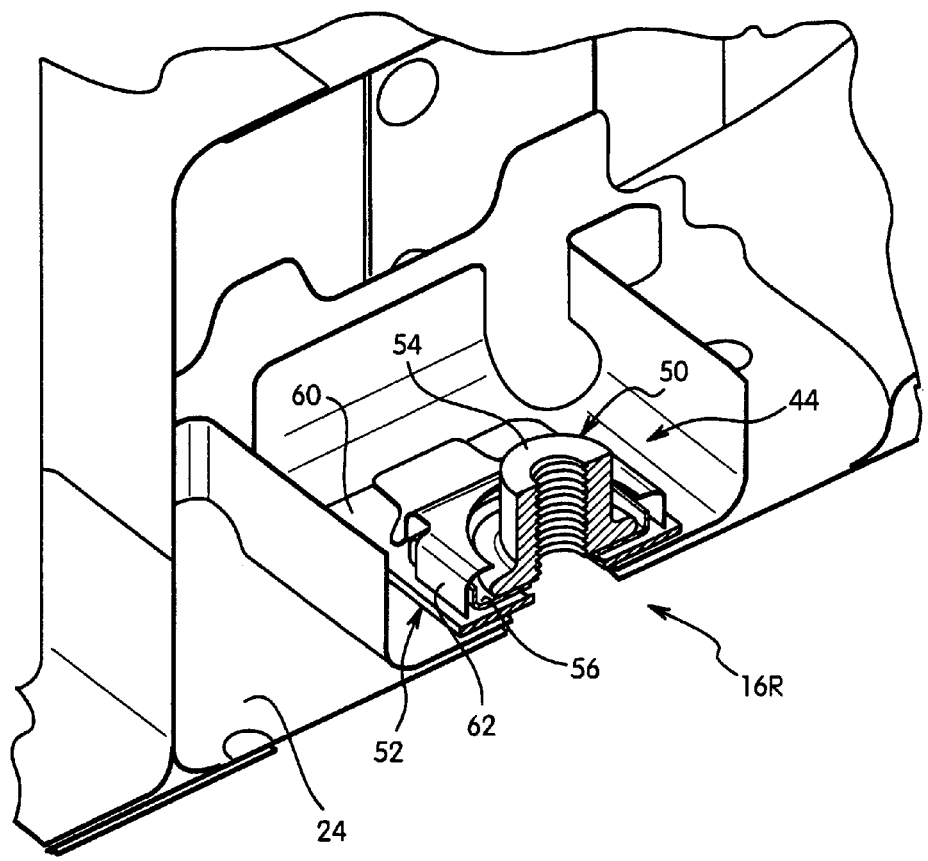
FIG. 9 is a simplified partial cross sectional view of the right rearmost vehicle floating nut assembly in accordance with the present invention.
Figure 10:
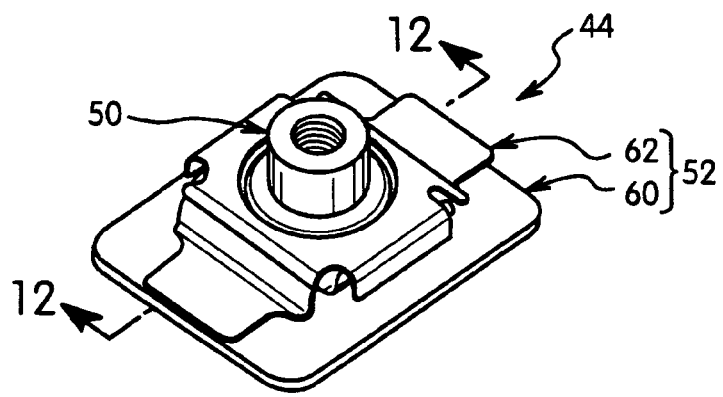
FIG. 10 is a perspective view of the vehicle floating nut assembly that is used for nine out of ten vehicle floating nut assemblies that are mounted to the vehicle body in accordance with the present invention.
Figure 11:
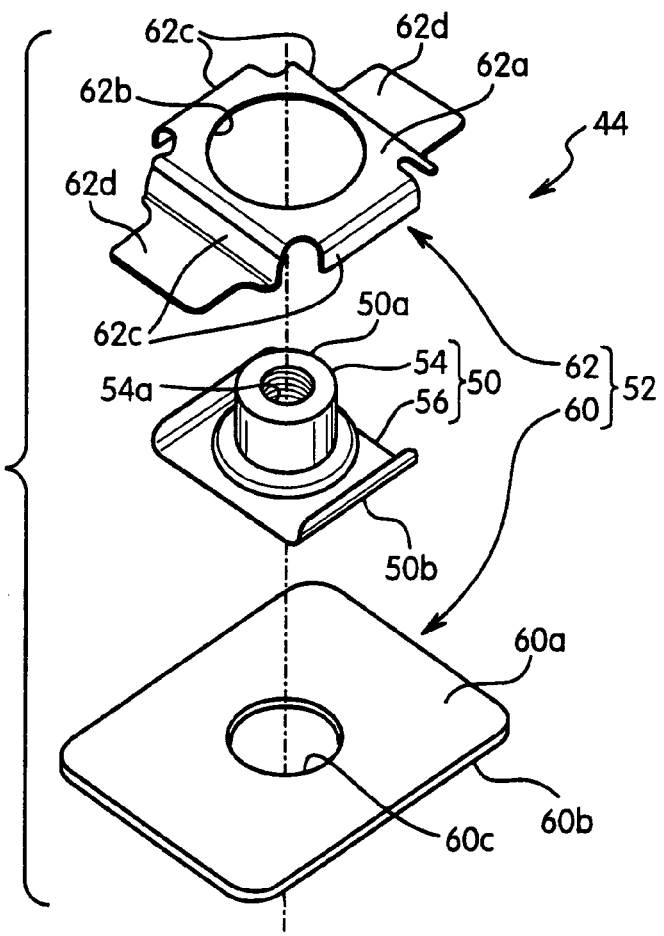
FIG. 11 is an exploded perspective view of the vehicle floating nut assembly illustrated in FIG. 10 in accordance with the present invention.
Figure 12:
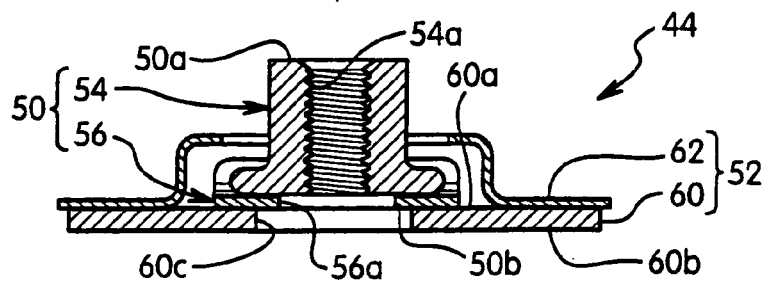
FIG. 12 is a cross-sectional view of the vehicle floating nut assembly illustrated in FIGS. 10 and 11 in accordance with the present invention.

Referring now to FIGS. 5 and 6, the vehicle body mounting fixtures 16R and 16L' that corresponds to the rearmost mounting fixtures are fixedly coupled to opposite lateral ends of the rearmost one of the lateral support members 24. Since the remaining vehicle body mounting fixtures 16R and 16L are identical to the rearmost mounting fixture 16R, the rearmost mounting fixture 16R will now be used to explained the structure for all of the vehicle body mounting fixtures 16R and 16L.

Basically, the vehicle body mounting fixtures 16R comprises a bolt 40, an insulator member 42 and a vehicle floating nut assembly 44. The insulator member 42 is fixedly coupled to the vehicle frame 14, while the vehicle floating nut assembly 44 is fixedly coupled to the lateral support member 24, which is welded to the vehicle body 12. The bolt 40 couples the insulator member 42 to the vehicle floating nut assembly 44 to fixedly couple the vehicle body 12 to the vehicle frame 14.

Basically, the insulator member 42 is conventional element, and thus, the insulator member 42 will not be discussed or illustrated in detail herein. The insulator member 42 includes, for example, a pair of rubber elements 46 sandwiched between three metal washers 48. The insulator member 42 is initially attached to the vehicle frame 14 in a mounting hole 14a that forms the mounting point $F_1$ of the vehicle frame 14. Thus, the insulator member 42 is initially attached prior to attaching the vehicle body 12 to the vehicle frame 14. Once the vehicle body 12 is positioned on top of the insulator member 42, the bolt 40 is inserted into the insulator member 42 such that the bolt 40 extends upwardly through center bores in the rubber elements 46 and the metal washers 48. The bolt 40 is then threaded into the vehicle floating nut assembly 44 to fixedly secure the vehicle body 12 to the vehicle frame 14. The attachment of the vehicle body 12 to the vehicle frame 14 is improved by the use of the vehicle floating nut assembly 44 as explained below.

Referring now to FIGS. 8-12, the vehicle floating nut assembly 44 basically includes a nut element 50 and a nut retainer assembly 52. The nut retainer assembly 52 retains the nut element 52 thereto such that the nut element 50 can float in at least both a longitudinal direction and a lateral direction relative to the nut retainer assembly 52. Preferably, the nut element 50 slides a first predetermined amount within the nut retainer assembly 52 in the longitudinal direction and a second predetermined amount within the nut retainer assembly 52 in the lateral direction. More preferably, the nut element 50 and the nut retainer assembly 52 are configured and arranged such that the nut element 50 can slide in any direction relative to the nut retainer assembly 52 by a predetermined amount from a center location of the nut retainer assembly 52.

The nut element 50 preferably includes a nut 54 and a support plate 56. The nut 54 is preferably projection welded to the support plate 56 so as to form a single unit. As explained below, the nut element 50 is dipped or immersed in a tank containing a coating resistant material in a liquid form. One example of a coating resistant material is polytetrafluoroethylene (PTFE). This results in the entire nut element 50 being coated with the coating resistant material that is resistant to adherence of a coating that is to be applied to the vehicle body 12. The term "coating resistant material" as used herein refers to a material that is resistant to any type of coating that would be applied to a vehicle body that can result in the nut element 50 become adhered to the nut retainer assembly 52 such that the nut element 50 is no longer freely floating within the nut retainer assembly 52. More preferably, the coating resistant material on the nut element 50 is at least a paint resistant material that is resistant to adherence of paint that is to be applied to the vehicle body 12 such as an e-coat, an undercoat, color coat or the like.

Accordingly, when the vehicle floating nut assemblies 44 are coupled to the vehicle body 12, paint will not adhere to the nut element 50 such that the nut element 50 will freely float within the nut retainer assembly 52 after painting. Moreover, the coating resistant material preferably extends over the threaded bore such that paint does not adhere the threads the nut element 50. Thus, the bolt 40 can be easily threaded into the threads of the nut element 50 when the vehicle body 12 is being attached to the frame 14 after painting of the vehicle body 12.

The nut element 50 has a first axial end surface 50a formed by the nut 54 and a second axial end surface 50b formed by the support plate 56. The second end axial surface 50b of the nut element 50 is a sliding surface that is configured and arranged to slide on the nut retainer assembly 52 as explained below. The nut 54 has a threaded bore 54a that extends axially from the first axial end surface 50a to the second axial end surface 50b. The threaded bore 54a is sized and dimensioned to threadedly receive the bolt 40.

The support plate 56 is a metal plate that has a through hole 56a that is concentrically aligned with the threaded bore 54a of the nut 54 such that the bolt 40 can freely pass through the support plate 56 when the bolt 40 is threaded onto the nut 54. Preferably, opposite ends of the support plate 56 are curved upwardly from a center planar portion where the nut 54 is fixedly secured.

The nut retainer assembly 52 basically includes a mounting plate 60 and a retaining member 62. The mounting plate 60 is preferably a flat plate having an upper sliding surface 60a and a lower body attachment surface 60b. The mounting plate 60 has a centrally located aperture 60c that is larger than the hole 56a of the support plate 56 of the nut element 50. This arrangement allows a certain amount of play in all directions for aligning the bolt 40 with the threaded bore 54a of the nut 54. Preferably, the mounting plate 60 is spot welded to the vehicle body 12 (e.g., one of the lateral structural support members 24 or one of the support brackets 30).

The retaining member 62 of the nut retainer assembly 52 is preferably constructed at of the metallic sheet material that is configured and arranged relative to the mounting plate 60 to form a nut element receiving space between the retaining member 62 and the mounting plate 60. In particular, the retaining member 62 has a center plate portion 62a with a centrally located opening or aperture 62b, four leg portions 62c, and a pair of mounting tabs 62d. Preferably, the center plate portion 62a with the aperture 62b forms a nut movement controlling portion that limits relative movement of the nut element 50 within the nut retainer assembly 52. The center plate portion 62a is rectangular plate like element having the leg portions 62c extending downwardly from its sides towards the mounting plate 60. Two of the opposite leg portions 62c have the mounting tabs 62d extending outwardly therefrom. Preferably, the mounting tabs 62d are arranged to be substantially parallel to the center plate portion 62a. The mounting tabs 62d are preferably spot welded to the mounting plate 60 such that the mounting plate 60 and the retaining member 62 form a single unit with the nut element 50 retained therebetween such that the second axial end surface 50b of the nut element 50 is arranged to slide on the planer sliding surface 60a of the mounting plate 60.

Preferably, the aperture 62b of the retaining member 62 is circular with the first axial end of the nut 54 projecting outwardly through the aperture 62b from the nut element receiving space. Thus, movement of the nut element 50 is limited by the upper end of the nut 54 of the nut element 50 contacting the peripheral edge of the aperture 62b of the retaining member 62. Since the cross-section of the upper end of the nut 54 of the nut element 50 that projects through the aperture 62b of the retaining member 62 is also substantially circular, the nut element 50 can substantially float in any direction relative to the nut retainer assembly 52. In other words, the nut element 50 is not limited to the longitudinal and lateral directions of movement. In any event, the aperture 62b of the retaining member 62 and the upper end of the nut 54 of the nut element 50 disposed within the aperture 62b of the retaining member 62 are sized and dimensioned to limit movement of the nut element 50 within a predetermined range of movement. Preferably, the aperture 62b of the retaining member 62 and the upper end of the nut 54 of the nut element 50 are at least dimensioned such that the nut element 50 can at least move in a first range of limited movement along a first or longitudinal direction of the vehicle body 12 and a second range of limited movement in a second or lateral direction of the vehicle body 12 that is substantially perpendicular to the first or longitudinal direction of the vehicle body 12.

As mentioned above, preferably, the vehicle body 12 and the vehicle frame 14 are coupled together by five right hand side (first) vehicle body mounting fixtures 16R, four left hand side (second) vehicle body mounting fixtures 16L and one left hand side (third) vehicle body mounting fixture 16L'. Thus, the vehicle body 12 has nine vehicle floating nut assemblies 44. All of the floating nut assemblies 44 are substantially identical in construction such that the nut elements 50 can float in at least the longitudinal and lateral directions of the vehicle body 12. However, as mentioned above, the vehicle body mounting fixture 16L', which is attached to the rearmost mounting point on the second longitudinal side of the vehicle body, has a slightly different arrangement.

Basically, the mounting fixture 16L' is identical to the vehicle body mounting fixtures 16R, as discussed above except that a modified vehicle floating nut assembly 44' is utilized in the mounting fixture 16L'. Thus, the descriptions and illustrations of the mounting fixtures 16R apply to the vehicle body mounting fixtures 16L' except for the modified vehicle floating nut assembly 44'. In other words, the mounting fixture 16L' includes the bolt 40, the insulator member 42 and the vehicle floating nut assembly 44'. The vehicle floating nut assembly 44' is fixedly coupled to the vehicle body 12 at the rearmost driver's side of the mounting points.

Figure 13:
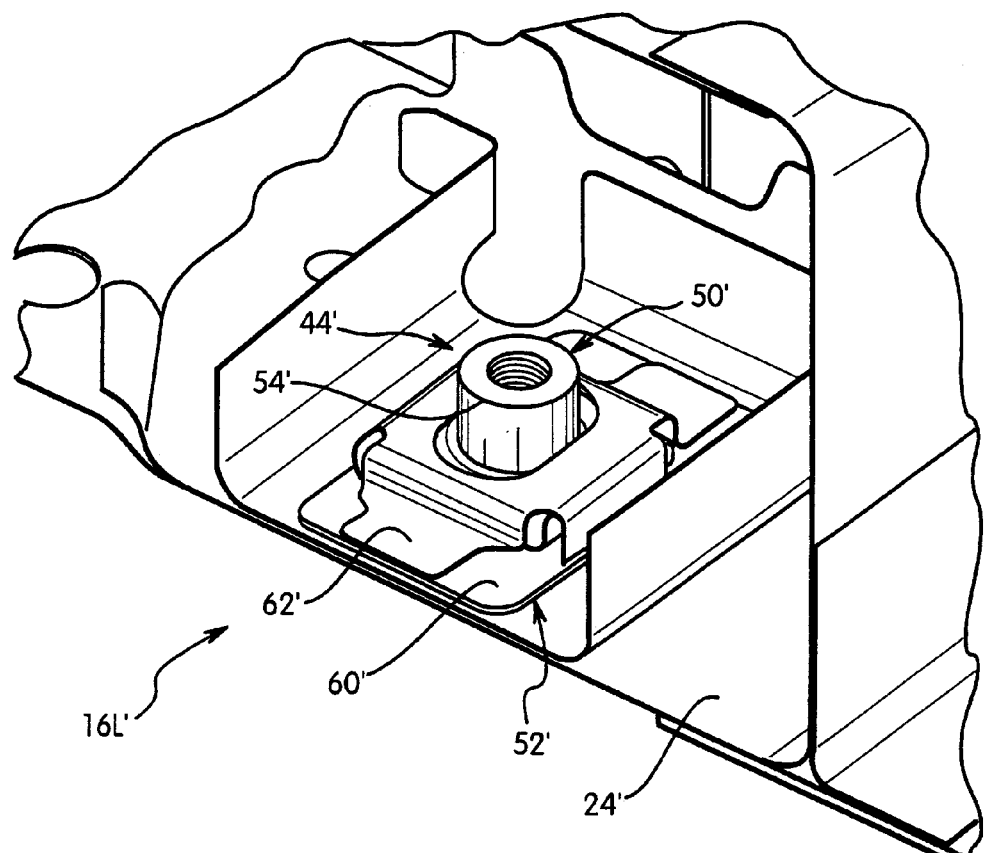
FIG. 13 is a simplified partial perspective cross sectional view of the rearmost lateral structural support member and the left rearmost vehicle floating nut assembly in accordance with the present invention.
Figure 14:
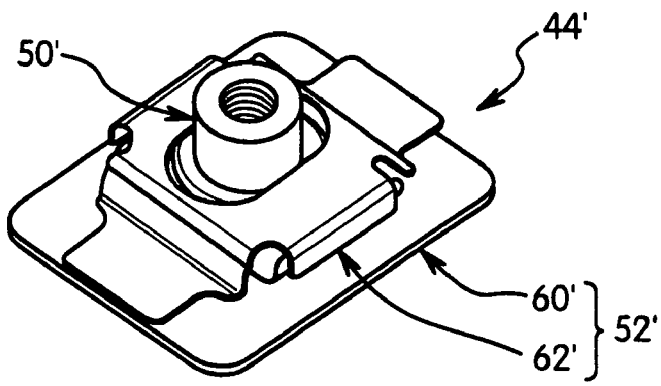
FIG. 14 is a perspective view of the left rearmost vehicle floating nut assembly illustrated in FIG. 13 in accordance with the present invention.
Figure 15:
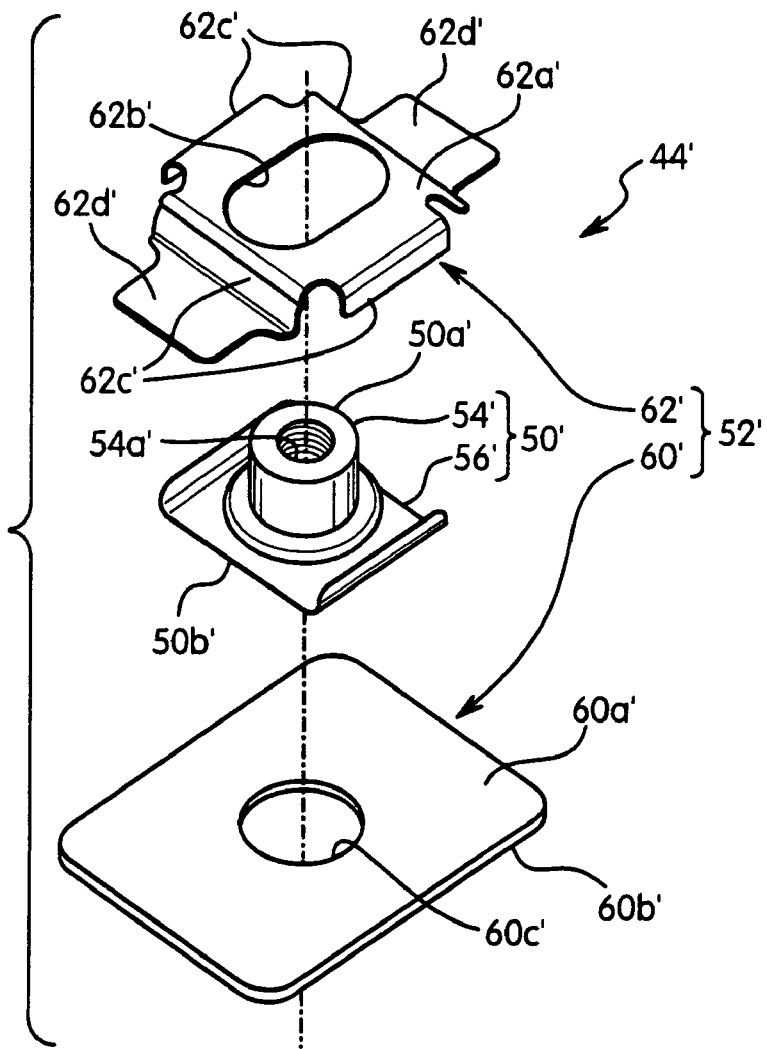
FIG. 15 is an exploded perspective view of the left rearmost vehicle floating nut assembly illustrated in FIGS. 13 and 14 in accordance with the present invention.

As seen in FIGS. 13 to 15, the vehicle floating nut assembly 44' basically includes a nut element 50' and a nut retainer assembly 52'. The nut retainer assembly 52' retains the nut element 52' thereto such that the nut element 50' can float relative to the nut retainer assembly 52' only in a longitudinal direction of the vehicle body 12. The nut element 50' preferably includes a nut 54' and a support plate 56'. The nut element 50' is identical to the nut element 50 that is discussed above. Thus, the nut element 50' is dipped or immersed in the tank containing the coating resistant material in a liquid form in the same manner as the nut element 50.

The nut retainer assembly 52' basically includes a mounting plate 60' and a retaining member 62'. The mounting plate 60' is identical to mounting plate 60 that is discussed above. However, the retaining member 62' is slightly different in that the nut element 50' is restrained by the retaining member 62' so that the nut element 50' can float in only a longitudinal direction of the vehicle body 12. The retaining member 62' of the nut retainer assembly 52' is preferably constructed of the metallic sheet material that is configured and arranged relative to the mounting plate 60' to form a nut element receiving space between the retaining member 62' and the mounting plate 60'. In particular, the retaining member 62' has a center plate portion 62a' with a centrally located opening or aperture 62b', four leg portions 62c', and a pair of mounting tabs 62d'. Preferably, the center plate portion 62a' with the aperture 62b' forms a nut movement controlling portion that limits relative movement of the nut element 50' within the nut retainer assembly 52' to longitudinal movement. The center plate portion 62a is rectangular plate like element having the leg portions 62c' extending downwardly from its sides towards the mounting plate 60'. Two of the opposite leg portions 62c' have the mounting tabs 62d' extending outwardly therefrom. Preferably, the mounting tabs 62d' are arranged to be substantially parallel to the center plate portion 62a'. The mounting tabs 62d' are preferably spot welded to the mounting plate 60' such that the mounting plate 60' and the retaining member 62' form a single unit with the nut element 50'.

Preferably, the aperture 62b' of the retaining member 62' is an elongated slot with the first axial end of the nut 54' projecting outwardly through the aperture 62b' from the nut element receiving space. Thus, movement of the nut element 50' is limited by the upper end of the nut 54' of the nut element 50' contacting the peripheral edge of the aperture 62b' of the retaining member 62'. Since the cross-section of the upper end of the nut 54' of the nut element 50' that projects though the aperture 62b' of the retaining member 62' is substantially circular, the nut element 50' can substantially float only in a longitudinal direction relative to the nut retainer assembly 52'. In particular, as seen in FIGS. 13-15, the opening or aperture 62b' of the retaining member 62' has a pair of first opposed abutments and a pair of second opposed abutments to substantially only allow a limited range of movement of the first axial end of the nut element 50' in one linear direction. The first opposed abutments of the opening or aperture 62b' are arranged to substantially prevent linear movement in a perpendicular direction to the one linear direction, while the second opposed abutments of the opening or aperture 62b' are arranged to allow the nut element 50' to freely move along the limited range of movement in the one linear direction relative to the retaining member 62'. The first opposed abutments of the opening or aperture 62b' are configured and arranged to maintain a constant maximum amount of movement in the perpendicular direction to the one linear direction along the entire limited range of movement in the one linear direction.

Of course, it will be apparent to one skilled in the art from this disclosure that the modified vehicle floating nut assembly 44' can be utilized in the right rearmost body mounting portion VB1 of the vehicle body 12 instead of the left rearmost body mounting portion VB$_2$. In other words, the vehicle body 12 and the vehicle frame 14 can be fixedly coupled together such that five left hand side mounting portions VB$_2$, VB$_4$, VB$_6$, VB$_8$, VB$_{10}$ of the vehicle body 12 and the five left hand side mounting portions F$_2$, F$_4$, F$_6$, F$_8$, F$_{10}$ of the vehicle frame 14 are interconnected by a plurality of left hand side vehicle body mounting fixtures 16L, while four out of the five right hand side mounting portions VB$_3$, VB$_5$, VB$_7$, VB$_9$ of the vehicle body 12 and four out of the five right hand side mounting portions F$_3$, F$_5$, F$_7$, F$_9$ of the vehicle frame 14 are interconnected by a plurality of right hand side vehicle body mounting fixtures 16R. The right hand side mounting portion VB$_1$ of the vehicle body 12 and the left hand side mounting portion F$_1$ of the vehicle frame 14 are interconnected by a mounting fixture utilizing the modified vehicle floating nut assembly 44'.

Figure 16:
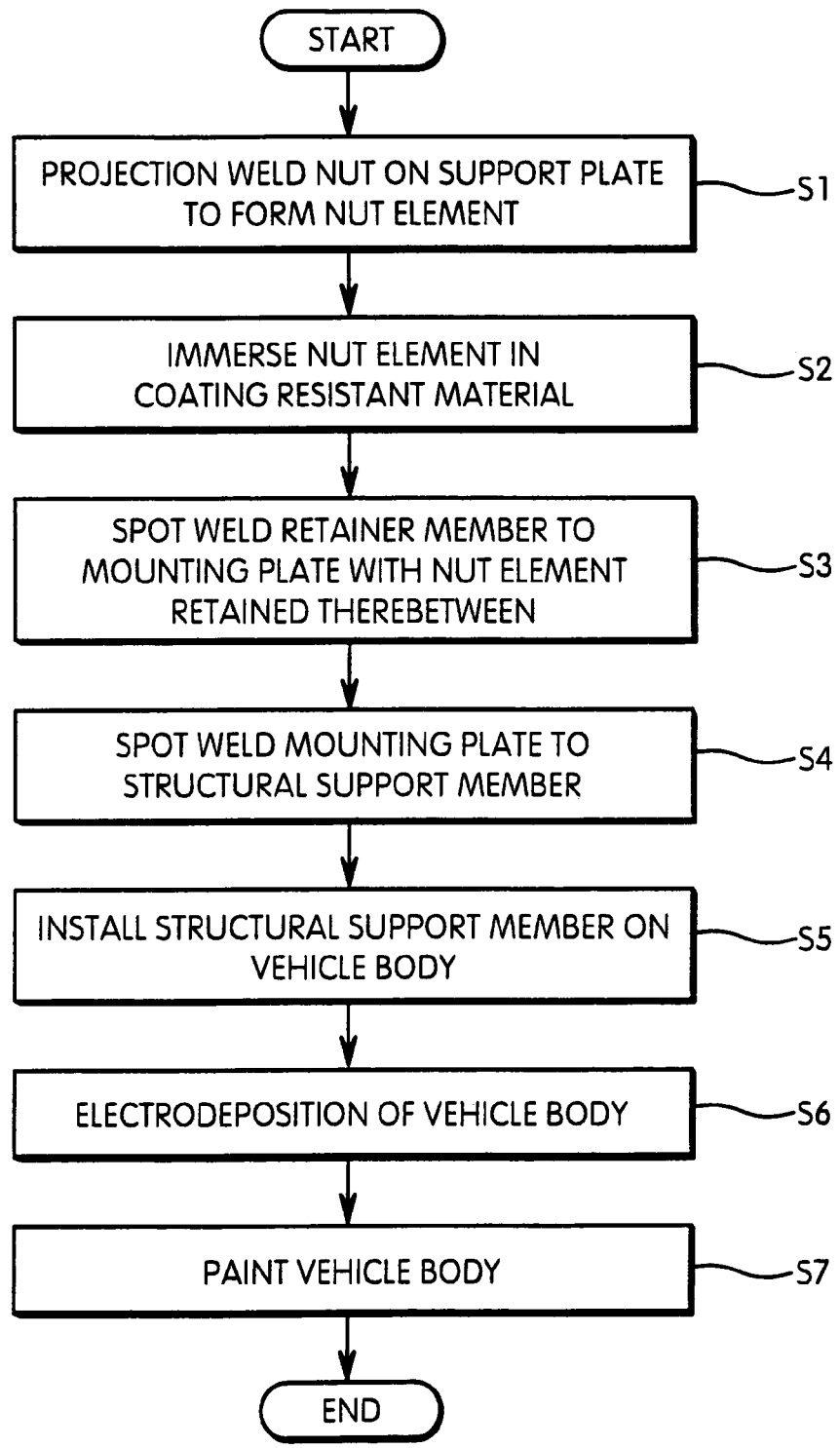
FIG. 16 is a flow chart illustrating one preferred vehicle body installation method of applying the a coating resistant material such as polytetrafluoroethylene to the nut element, installing the vehicle floating nut assemblies and then e-coating and painting the vehicle body in accordance with the present invention.

Referring now to FIG. 16, the vehicle body installation method in which the vehicle floating nut assemblies 44 and 44' are installed in the vehicle body 12 in accordance with the present invention will be explained. The vehicle body installation method of the vehicle floating nut assembly 44 is identical to the vehicle body installation method of the vehicle floating nut assembly 44'. Thus, only the vehicle body installation method of the vehicle floating nut assembly 44 will be explain for the sake of brevity.

In step S1, the nut 54 of the nut element 50 is preferably projection welded to the support plate 56 to form the nut element 50 as a single unit. In step S2, the nut element 50 is dipped or immersed in a tank containing a coating resistant material, preferably polytetrafluoreoethylene (PTFE) in a liquid form to coat the nut element 50 with the coating resistant material. Then, in step S3, the mounting tabs 62d of the retaining member 62 are spot welded to the mounting plate 60 such that the mounting plate 60 and the retaining member 62 form the vehicle floating nut assembly 44 as a single unit with the nut element 50 retained therebetween. In step S4, the mounting plate 60 of the vehicle floating nut assembly 44 is welded onto the structural support member (e.g., the lateral structural support member 24 or the structural support bracket 30). In step S5, the structural support member with the vehicle floating nut assembly 44 is fixedly coupled to the vehicle body 12. In step S6, the vehicle body 12 is applied with electrodeposition (e-coat). In step S7, the vehicle body 12 is coated with vehicle paint. As explained above, the nut element 50 of the vehicle floating nut assembly 44 is coated with the coating resistant material so that the e-coat and the paint will not adhere to the nut element 50 such that the nut element 50 will freely float within the nut retainer assembly 52 after e-coating and painting.

It will be apparent to those skilled in the art from this disclosure that the vehicle body mounting fixtures 16R, 16L, and 16L' can be used to fixedly couple a vehicle body to a vehicle frame in any type of vehicles. In other words, the vehicle body mounting fixtures 16R, 16L, and 16L' are not limited to be used as a total number of ten. For example, three vehicle body mounting fixtures 16R, two vehicle body mounting fixtures 16L, and one vehicle body mounting fixtures 16L' can be utilized to fixedly couple a vehicle body of a cab portion of a pickup truck to a frame of the pickup truck. In such a case, the vehicle body mounting fixtures 16L' is preferably used to interconnect one of the rearmost mounting portions of the cab portion and the vehicle frame.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle floating nut assembly comprising:
    a nut element including a nut with an axially extending threaded bore and a support plate with an opening, the support plate being permanently fixed to the nut with the threaded bore being aligned with the opening of the support plate, with a first axial end surface of the nut element being formed by the nut and a second axial end surface of the nut element being formed by the support plate; and
    a nut retainer assembly having a mounting plate with an aperture and a retaining member fixedly coupled to the mounting plate as a separate member to retain the nut element such that the second axial end surface of the nut element is arranged to slide on a planar surface of the mounting plate,
    the retaining member being a deformed sheet metal element having a closed aperture defined by a continuous peripheral edge with a portion of the nut element disposed therein and the closed aperture being configured to limit movement of the nut element within a predetermined range of movement.

2. The vehicle floating nut assembly according to claim 1, wherein
    the second axial end surface of the nut element includes a coating resistant material that is resistant to adherence of a coating.

3. The vehicle floating nut assembly according to claim 1, wherein
    exposed areas of the nut element that at least includes the second axial end surface of the nut element and the threaded bore of the nut element have a coating resistant material that is resistant to adherence of a coating.

4. The vehicle floating nut assembly according to claim 1, wherein
    the support plate has a pair of opposite ends that are curved to extend in a direction generally towards the first axial end surface of the nut element.

5. The vehicle floating nut assembly according to claim 1, wherein
    one of the second axial end surface and the planar surface being coated with a coating resistant material that is resistant to adherence of a coating.

6. The vehicle floating nut assembly according to claim 5, wherein
    the coating resistant material is polytetrafluoroethylene.

7. The vehicle floating nut assembly according to claim 1, wherein
    the closed aperture of the retaining member and the nut element are configured and arranged to allow at least a first range of limited movement of the nut element in a first direction and a second range of limited movement in a second direction that is substantially perpendicular to the first direction.

8. The vehicle floating nut assembly according to claim 7, wherein
    the closed aperture of the retaining member and the portion of the nut element disposed in the closed aperture of the retaining member have corresponding shapes such that the nut element is slideable relative to the planar surface of the mounting plate in all directions from a center position.

9. The vehicle floating nut assembly according to claim 1, wherein
    the mounting plate of the nut retainer assembly is fixedly coupled to a vehicle body structural element.

10. The vehicle floating nut assembly according to claim 9, wherein
    the nut element and the nut retainer assembly form a first mounting part fixed to a first lateral end of the vehicle body structural element, and a second lateral end of the vehicle body structural element has a second mounting part including an additional nut element and an additional nut retainer assembly.

11. The vehicle floating nut assembly according to claim 10, wherein
the additional nut element has an additional first axial end surface, an additional second axial end surface and an additional axially extending threaded bore; and
the additional nut retainer assembly has an additional mounting plate with an additional aperture and an additional retaining member coupled to the additional mounting plate to retain the additional nut element such that the additional second axial end surface of the additional nut element is arranged to slide on an additional planar surface of the additional mounting plate.

12. A vehicle floating nut assembly comprising:
a nut element with a first axial end, a second axial end and an axially extending threaded bore; and
a nut retainer assembly having a mounting plate with an aperture and a retaining member fixed to the mounting plate as a separate member to retain the nut element therebetween such that the second axial end of the nut element is arranged to slide on a planar surface of the mounting plate,
the retaining member having an opening with a portion of the first axial end of the nut element disposed therein to limit movement of the nut element within a predetermined range of movement,
the opening of the retaining member and the first axial end of the nut element being configured and arranged with a pair of first opposed abutments and a pair of second opposed abutments to substantially only allow a limited range of movement of the first axial end of the nut element in one linear direction with the first opposed abutments being arranged to substantially prevent linear movement in a perpendicular direction to the one linear direction and the second opposed abutments being arranged to allow the nut element to freely move along the limited range of movement in the one linear direction relative to the retaining member, the first opposed abutments being configured and arranged to maintain a constant maximum amount of movement in the perpendicular direction to the one linear direction along the entire limited range of movement in the one linear direction.

13. The vehicle floating nut assembly according to claim 12, wherein
the opening of the retaining member is a substantially elongated slot with a minimum width that is substantially equal to a maximum width of the portion of the first axial end of the nut element disposed therein.

14. A vehicle floating nut assembly comprising:
a vehicle body structural element configured and arranged to be part of a vehicle body;
a first mounting part fixed to a first portion of the vehicle body structural element, the first mounting part including
a first nut element having a first threaded bore extending in an axial direction and a first planar end surface perpendicular to the first threaded bore, and
a first nut retainer assembly having a first mounting plate fixedly secured to the vehicle body structural element and a first retaining member fixed relative to the first mounting plate to substantially only allow limited movement of the first nut element in a first linear direction relative to the vehicle body structural element, the first retaining member having opposed abutments configured and arranged to maintain a constant maximum amount of movement in a second linear direction that is substantially perpendicular to the first linear direction along an entire length of the limited movement in the first linear direction,
the first mounting plate having a first planar sliding surface in sliding contact with the first planar end surface of the first nut element; and
a second mounting part fixed to a second portion of the vehicle body structural element that is spaced from the first portion of the vehicle body structural element, the second mounting part including
a second nut element having a second threaded bore extending in an axial direction and a second planar end surface perpendicular to the second threaded bore, and
a second nut retainer assembly having a second mounting plate fixedly secured to the vehicle body structural element and a second retaining member fixed relative to the second mounting plate to allow at least a first range of limited movement of the second nut element in the first linear direction and a second range of limited movement in the second linear direction, the second range of movement of the second nut element in the second linear direction being larger than any amount of movement of the first nut element in the second linear direction,
the second mounting plate having a second planar sliding surface in sliding contact with the second planar end surface of the second nut element.

15. The vehicle floating nut assembly according to claim 14, wherein
the first and second threaded bores and the first and second planar end surfaces of the first and second nut elements include a coating resistant material that is resistant to adherence of a coating.

16. The vehicle floating nut assembly according to claim 14, wherein
the first nut element includes a first nut with the first threaded bore and a first support plate with a first opening, the first support plate being permanently fixed to the first nut with the first threaded bore being aligned with the first opening of the first support plate; and
the second nut element includes a second nut with the second threaded bore and a second support plate with a second opening, the second support plate being permanently fixed to the second nut with the second threaded bore being aligned with the second opening of the second support plate.

17. The vehicle floating nut assembly according to claim 16, wherein
the first support plate has a pair of opposite ends that are curved to extend in a direction away from the first mounting plate; and
the second support plate has a pair of opposite ends that are curved to extend in a direction away from the second mounting plate.

18. The vehicle floating nut assembly according to claim 16, wherein
the first retaining member includes a first center portion with a first opening with a portion of the first nut element disposed therein and a pair of first mounting portions fixed to the first mounting plate; and
the second retaining member includes a second center portion with a second opening with a portion of the second nut element disposed therein and a pair of second mounting portions fixed to the second mounting plate.

19. The vehicle floating nut assembly according to claim 18, wherein the first support plate has a pair of opposite ends that are curved to extend in a direction away from the first mounting plate; and the second support plate has a pair of opposite ends that are curved to extend in a direction away from the second mounting plate.

20. The vehicle floating nut assembly according to claim 19, wherein the first opening of the first retaining member is a substantially elongated slot with a minimum width that is substantially equal to a maximum width of a portion of the first nut element disposed within the first opening.

21. The vehicle floating nut assembly according to claim 20, wherein the second opening of the second retaining member and the portion of the second nut element disposed in the second opening of the second retaining member have corresponding shapes such that the second nut element is slideable relative to the second planar sliding surface of the second mounting plate in all directions from a center position.

22. The vehicle floating nut assembly according to claim 21, wherein the first and second threaded bores and the first and second planar end surfaces of the first and second nut elements include a coating resistant material that is resistant to adherence of a coating.

23. The vehicle floating nut assembly according to claim 14, wherein the first retaining member is fixedly coupled to the first mounting plate as a separate member to retain the first nut element; and the second retaining member is fixedly coupled to the second mounting plate as a separate member to retain the second nut element.

24. The vehicle floating nut assembly according to claim 14, wherein the first retaining member is a deformed sheet metal element having a first opening with a portion of the first nut element disposed therein with the first opening being configured to limit movement of the first nut element; and the second retaining member is a deformed sheet metal element having a second opening with a portion of the second nut element disposed therein with the second opening being configured to limit movement of the second nut element.

25. The vehicle floating nut assembly according to claim 24, wherein the first opening of the first retaining member is a substantially elongated slot with a minimum width that is substantially equal to a maximum width of a portion of the first nut element disposed within the first opening.

26. The vehicle floating nut assembly according to claim 24, wherein the second opening of the second retaining member and the portion of the second nut element disposed in the second opening of the second retaining member have corresponding shapes such that the second nut element is slideable relative to the second planar sliding surface of the second mounting plate in all directions from a center position.

27. The vehicle floating nut assembly according to claim 26, wherein the first opening of the first retaining member is a substantially elongated slot with a minimum width that is substantially equal to a maximum width of a portion of the first nut element disposed within the first opening.

28. A vehicle floating nut assembly comprising:

a nut element including a nut with an axially extending threaded bore and a support plate with an opening and a pair of opposite ends that are curved in a direction generally toward a side of the support plate having the nut, the support plate being permanently fixed to the nut with the threaded bore being aligned with the opening of the support plate; and a nut retainer assembly having a mounting plate with an aperture and a retaining member configured to retain the nut element such that the support plate has an end surface in sliding contact with a planar sliding surface of the mounting plate, the retaining member being a deformed sheet metal element having a closed aperture defined by a continuous peripheral edge with a portion of a first axial end of the nut element disposed therein and the closed aperture being configured to limit movement of the nut element within a predetermined range of movement.

29. The vehicle floating nut assembly according to claim 28, wherein the threaded bore and the end surface of the nut element include a coating resistant material that is resistant to adherence of a coating.

30. The vehicle floating nut assembly according to claim 28, wherein the closed aperture of the retaining member is a substantially elongated slot with a minimum width that is substantially equal to a maximum width of the portion of the nut element disposed within the closed aperture.

31. The vehicle floating nut assembly according to claim 28, wherein the closed aperture of the retaining member and the portion of the nut element disposed in the closed aperture of the retaining member have corresponding shapes such that the nut element is slideable relative to the planar sliding surface of the mounting plate in all directions from a center position.

32. The vehicle floating nut assembly according to claim 28, wherein the retaining member includes a center portion with the closed aperture and a pair of mounting portions fixed to the mounting plate.

33. The vehicle floating nut assembly according to claim 28, wherein the retaining member includes a center portion with the closed aperture and four leg portions extending perpendicularly from the center portion with two of the leg portions being fixed to the mounting plate.

* * * * *